United States Patent [19]

Scharfenberg et al.

[11] Patent Number: 4,561,918

[45] Date of Patent: Dec. 31, 1985

[54] METHOD OF MANUFACTURING CORRUGATED PAPERBOARD PRODUCT USING A FOAMED ADHESIVE

[75] Inventors: Paul M. Scharfenberg, Hurst; Kenneth N. Findley, Jr., Arlington, both of Tex.

[73] Assignee: Findley Adhesives, Inc., Elm Grove, Wis.

[21] Appl. No.: 726,927

[22] Filed: Apr. 25, 1985

Related U.S. Application Data

[63] Continuation of Ser. No. 365,585, Apr. 5, 1982, abandoned.

[51] Int. Cl.$^4$ .................. B32B 31/14; B32B 3/28
[52] U.S. Cl. .................... 156/78; 156/210; 156/292; 156/334; 428/186; 428/317.5
[58] Field of Search .............. 156/78, 210, 292, 334; 424/335, 337; 428/182, 186, 317.5; 521/69; 524/563

[56] References Cited

U.S. PATENT DOCUMENTS 3,247,040  4/1966  Fine et al. .................. 156/210
3,984,275  10/1976  Hofmann et al. ............ 156/210 X
4,243,568  1/1981  Brown ........................ 524/563 X

OTHER PUBLICATIONS

Hughes, Frank T. "Foamed Hot Melt Adhesives", *Adhesives Age*, Sep. 1982, pp. 25–29.

*Primary Examiner*—Robert A. Dawson
*Attorney, Agent, or Firm*—Andrus, Sceales, Starke & Sawall

[57] ABSTRACT

A vinyl acetate ethylene copolymer adhesive obtains the production of a corrugated paperboard product at ambient temperatures without the need for the heat inputs heretofore required. The adhesive is foamed to expand it so that less adhesive material is required to a given quantity of product.

17 Claims, No Drawings

METHOD OF MANUFACTURING CORRUGATED PAPERBOARD PRODUCT USING A FOAMED ADHESIVE

This application is a continuation of application Ser. No. 365,585, filed Apr. 5, 1982, and now abandoned.

The present invention relates to improvements in the manufacturing of corrugated paperboard products through use of a foamed adhesive.

Corrugated paperboard products consist of a fluted central medium having a liner glued to the tips of the flutes on one side (single faced product) or on both sides (double faced product).

Corrugated paperboard is made by passing the medium through heated fluting rolls to corrugate it. Adhesive, typically starch or starch based, is applied to the tips of the fultes by a glue roll and the liner placed on the medium to produce single faced board. If double faced board is being manufactured, adhesive is applied to the flutes on the other side of the medium and the second liner is placed on the medium. The product is then pressed between belts and passed down an elongated dryer section that sets and dries the starch adhesive.

In the past, the low cost of starch and starch based adhesives precluded the use of other types of adhesives. Even with the increasing energy expenses associated with the heating required of starch based adhesives, the cost advantages of starch with respect to non-starch adhesives, such as a mixture of clay and polyvinyl alcohol, were not fully offset.

In an effort to reduce adhesive costs so as to permit use of non-starch adhesives requiring less heat, attention has been given to applying the non-starch adhesives as a foam rather than as a liquid. The air bubbles of the foam expand the adhesive material and thus extend it so that less adhesive material is required for a given production quantity of product.

An early effort in this direction is described in U.S. Pat. No. 3,247,040 to Fine, et al involving the use of foamed polyvinyl acetate. The process of this patent did not find commercial acceptance in view of the technical problems of low processing speeds, poor bonds between the fluted medium and the liner, and the use of hazardous substances, and because the combined cost of the higher priced adhesive and required, though lessened, energy needs produced no economic advantage.

Be contrast, the present invention produces a highly satisfactory corrugated paperboard product in an economically advantageous manner permitting the manufacture to be carried out at the ambient temperature surroundinng the corrugating machine, generally without the need for supplemental heat. However, small quantities of heat may be used to provide a steam shower on the medium to facilitate corrugation and to preheat the double face liner to avoid warp in the finished product. The lack of heat or minimal quantities of heat saves energy costs in the manufacturing process. It also permits use of more sophisticated materials in the paperboard product, such as printed liners or liners having plastic laminates, that might otherwise suffer thermal damage.

The present invention provides a product having a greater degree of water resistance or proofness than existing corrugated materials. This attribute renders the product produced by the present invention suitable for containers for produce or other types of foodstuffs. In such containers, prolonged exposure to moisture, as from ice or humidity, is encountered. Containers formed of the product are not toxic to foodstuffs and meet various health and food regulations.

The process itself can be effectively and efficiently carried out on existing equipment, thereby lending further economy to utilization of the process.

To achieve the foregoing and other objects, the present invention employs a vinyl acetate ethylene copolymer based adhesive. The adhesive so based is foamed to extend the adhesive and thereafter applied to the tips of the medium flutes subsequent to the corrugation of the medium. A liner is then applied to the glued medium to produce a single faced corrugated product. If a double faced corrugated product is desired, the flutes on the other side of the medium are prepared with adhesive and a second liner applied to that side.

A highly satisfactory adhesive has been compounded by adding to the vinyl acetate ethylene copolymer, an insolubilizing agent that lends water resistance to the adhesive, and a preservative. Water is added to dilute the resulting adhesive. It has been found that an unfoamed adhesive having a viscosity of 250–700 centipoises, or more typically 300–325 centipoises, at 25° C. after compounding will achieve the objects of the present invention.

In regard to the vinyl acetate ethylene copolymer, the copolymer manufactured and sold by Air Products Corporation under the designation Airflex 300 is suitable for use in the present invention. Such a product consists of the copolymer in a protective colloidal suspension system. Oxalaldehyde, also called biformyl or diformyl, may be employed as the insolubilizing or cross linking agent. A suitable agent is that made and sold by Americal Hoechst under the designation Glyoxal 40%. The preservative may be an aqueous solution of 1, 2 benzisothiazolin-3-one such as that made and sold by ICI United States, Inc. under the designation Proxcel.

A formulation of the following general proportions by weight has been found to produce an adhesive highly suited for use in manufacturing corrugated paperboard products.

Vinyl acetate ethylene copolymer: 93 parts
water: 6+ parts
Glyoxal 40%: 0.2 parts
Proxcel: 0.1 parts A dye may be added to the adhesive to render the areas of application of the adhesive more readily visible.

It has been found that the adhesive should have 40–55% solids to achieve the objects of the present invention. Preferably, the solids should be in excess of 48%. This is necessary in order to insure that the medium and liner stick to each other when they are brought together and do not slip, i.e. move relative to one another, as they move through the corrugator.

The adhesive so formulated is foamed prior to application to the flutes of the corrugated medium. Commercially available foaming equipment may be employed for this purpose, as for example, that manufactured by Findley Adhesives, Inc. of Milwaukee, Wis. or Ease, Inc. of Dalton, Ga. In such equipment, air and adhesive are admitted to a chamber having a toothed rotor and toothed inner wall. The interaction of the rotor and inner walls as the rotor spins in the chamber whips the adhesive to a foam.

The consistency of the resulting foam is such that it is typically still pourable and will have a viscosity of between 1,000 and 4,000 centipoises, for example, around 2,000 centipoises. The foam may contain 40% to 60% air by weight and preferably around 50% air by weight. If there is too much air, the foam will not flow and there may be insufficient adhesive to bond the medium and the liner(s). If there is too little air there may be too much moisture for processing without heat. The size of the bubbles in the foam as it emerges from the foamer should be less than the gap between the applicator roll and the metering roll in the corrugating machine in order to avoid breaking the bubbles between the rolls. This gap may typically extend down to approximately 4 mils (0.004 inch). The bubble size should thus be 100 micron or less.

The foam is supplied to the glue pan of the corrugating machine at ambient temperature where it is picked up by the applicator roll and metered by the abutting metering roll.

The paperboard stock comprising the medium is passed between coacting grooved rollers that crimp that stock into the fluted medium. The medium then passes the adhesive applicator roll where the adhesive is applied to the tips of the flutes on one side of the medium. The medium and the paperboard stock forming the liner are passed between rolls that place the liner on the tips of the flutes containing the adhesive. Thereafter, the completed single faced product is moved to storage.

If double faced corrugated product is desired, the medium goes past a second adhesive applying roll that applies adhesive to the flute tips on the other side of the medium. The medium and liner are passed through an additional set of rolls where the second liner is applied to foam the double faced product. The liners and medium are then passed between the pressure belts that retain the medium and liners together until the adhesive is set.

In a typical corrugating machine, the surface of the applicator roll in the single facer section will be smooth and the considerations of bubble size are those given above. In the double facer section, the applicator roll may have an etched pattern or cells on the surface. It has been found that use of a roll having ten lines of cells per inch in the longitudinal and circumferential directions enhances the application of the foamed adhesive. The cells may have a depth of approximately 18 mils. The presence of the cells on the surface of the applicator roll permits larger bubble size without breaking between the rolls since the bubbles may rest in the cells. Bubble size of the adhesive may increase in the glue pan due to combination of small bubbles in the foam.

We claim:

1. A process for forming a corrugated paperboard product having a corrugated medium fastened to at least one liner, wherein the improvement comprises:

providing a water-based emulsion adhesive comprising vinyl acetate ethylene copolymers;
foaming the adhesive so provided;
applying the foamed adhesive at ambient temperature to the flutes of the corrugated medium;
adhering the liner to the medium by means of the adhesive and at ambient temperatures; and
applying pressure to opposite sides of the liner and medium until the adhesive sets.

2. The process of claim 1 further defined as providing an adhesive having from 40 to 55% solids.

3. The process of claim 2 further defined as providing an adhesive having at least 48% solids.

4. The process of claim 1 further defined as providing an adhesive having a viscosity in the unfoamed state of 200–700 centipoises at 25° C.

5. The process of claim 4 further defined as providing an adhesive having a viscosity in the unfoamed state of approximately 300–325 centipoises.

6. The process of claim 1 wherein the adhesive is foamed such that the resulting foamed adhesive has a viscosity in a range of from 1,000 to 4,000 centipoises.

7. The process of claim 6 wherein the adhesive is foamed such that the resulting foamed adhesive has a viscosity of approximately 2,000 centipoises.

8. The process of claim 4 further defined as providing an adhesive including a diluent.

9. The process of claim 8 further defined as providing an adhesive including water as a diluent.

10. The process of claim 1 further defined as providing an adhesive including an insolubilizing agent to enhance the water resistance of the bonds formed by the adhesive.

11. The process of claim 10 wherein said insolubilizing agent comprises oxalaldehyde.

12. The process of claims 1 or 10 further defined as providing an adhesive including a preservative.

13. The process of claim 12 wherein said preservative comprises an aqueous solution of 1, 2 benzisothiazolin-3-one.

14. The process of claim 1 further defined as a method for forming a double faced corrugated paperboard product having a liner on both sides of the medium and wherein the foamed adhesive is applied to the flutes on both sides of the corrugated medium, a liner is adhered to both sides of the medium, and pressure applied to the product without heat.

15. The process of claim 1 further defined as providing an adhesive having 40 to 60% air by weight.

16. The process of claim 15 further defined as providing an adhesive having 50% air by weight.

17. The process of claim 1 further defined as providing an adhesive having a bubble size of 100 microns or less.

* * * * *